(12) United States Patent
Otsuka et al.

(10) Patent No.: US 6,335,097 B1
(45) Date of Patent: Jan. 1, 2002

(54) LAMINATION MOLDING RESIN-COATED SAND AND LAMINATION MOLDING METHOD USING RESIN-COATED SAND

(75) Inventors: Yukio Otsuka, Aichi-ken; Motoaki Ozaki, Okazaki, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/351,368

(22) Filed: Jul. 12, 1999

(30) Foreign Application Priority Data

Jul. 13, 1998 (JP) .......................................... 10-197754

(51) Int. Cl.[7] ................................................. B32B 5/16
(52) U.S. Cl. ...................... 428/407; 427/508; 427/221
(58) Field of Search .......................... 428/407; 427/508, 427/221

(56) References Cited

U.S. PATENT DOCUMENTS

| | | | |
|---|---|---|---|
| 3,962,491 A | * 6/1976 | Sato et al. | 427/195 |
| 4,247,508 A | 1/1981 | Housholder | 264/219 |
| 4,691,756 A | * 9/1987 | Suzuki et al. | 164/361 |
| 4,888,240 A | * 12/1989 | Graham et al. | 428/403 |
| 5,204,055 A | 4/1993 | Sachs et al. | 419/2 |
| 5,718,279 A | 2/1998 | Satoh et al. | 164/456 |

FOREIGN PATENT DOCUMENTS

| | | |
|---|---|---|
| EP | 0 555 896 A1 | 8/1993 |
| EP | 0 776 713 A2 | 6/1997 |
| JP | 6-126377 | 5/1994 |
| JP | 8-90147 | 4/1996 |
| WO | WO 95/30503 | 11/1995 |
| WO | WO 96/30195 | 10/1996 |
| WO | WO 97/29148 | 8/1997 |

OTHER PUBLICATIONS

Communication dated Nov. 23, 1999 (1 page).
European Search Report Nov. 16, 1999 (2 pages).

* cited by examiner

*Primary Examiner*—Hoa T. Le
(74) *Attorney, Agent, or Firm*—Finnegan, Henderson, Farabow, Garrett & Dunner, L.L.P.

(57) ABSTRACT

Lamination molding resin-coated sand which can advantageously enhance accuracy for a formed article, is lamination molding resin-coated sand used for lamination molding for forming an article by laminating sand layers in thickness direction. Sand particles coated with resin are 20 to 100 μm in diameter and generally spherical. The resin has a mean molecular weight of about 2000 to 10000 and a fusion temperature of 100° C. or higher.

4 Claims, 4 Drawing Sheets

LAMINATION MOLDING RESIN-COATED SAND AND LAMINATION MOLDING METHOD USING RESIN-COATED SAND

INCORPORATION BY REFERENCE

The disclosure of Japanese Patent Application No. HEI 10-197754 filed on Jul. 13, 1998, including the specification, drawings and abstract, is incorporated herein by reference in its entirety.

BACKGROUND OF THE INVENTION

1. Field of the Invention

The present invention relates to a lamination molding resin-coated sand suited for lamination molding and a lamination molding method using the lamination molding resin-coated sand.

2. Description of the Related Art

In recent years, the development of the lamination molding technique (as disclosed by, for example, U.S. Pat. No. 4,247,508) is underway. With this lamination molding technique, a sand application step of applying resin-coated sand and forming a sand layer and a laser radiation step of radiating a laser beam to the sand layer to thereby form a solidified layer are alternately repeated, thereby sequentially forming many solidified layers and eventually forming a two-dimensional article.

The resin-coated sand, which has been conventionally provided by means of this lamination molding technique, is obtained by coating sand particles with resin and used for molding a shell casting mold by means of the shell molding method. Therefore, with the lamination molding technique using the above resin-coated sand, the enhancement of accuracy for the shape and dimensions of a formed article is limited. In the shell molding method, the cavity of a heated mold is filled with resin-coated sand, thereby thermally curing the resin of the resin-coated sand which contact with the cavity molding surface of the mold and forming a shell casting mold.

Namely, the sand particles of the resin-coated sand as conventionally provided have relatively large diameters, i.e., about 200 to 300 μm so as to ensure the discharge efficiency of discharging gas generated from the shell casting mold. Due to this, as shown in FIG. 7, a sand layer formed by the lamination molding technique, is thin and part of sand particles 53x quite likely protrude from the surface of the sand layer 500. If so, the irregularity of the surface of the sand layer 500 tends to increase. Besides, a cured layer, into which part of the sand layer 500 is formed, tends to have an irregular surface. For these reasons, there is a limit to the enhancement of accuracy for the shape and dimensions of a formed article. Further, the shell molding method is intended to thermally cure the resin soon after the resin-coated sand contacts with the high temperature cavity molding surface of the mold. The fusion temperature of the resin is, therefore, as low as 70 to 80° C.

With the above-stated resin-coated sand, the enhancement of accuracy for the shape of an article formed by lamination molding has its limit. So does the enhancement of the quality of the formed article have its limit.

SUMMARY OF THE INVENTION

The present invention has been made under these circumstances. It is, therefore, an object of the present invention to provide a lamination molding resin-coated sand and a lamination molding method capable of advantageously enhancing the accuracy and quality of a formed article.

A lamination molding resin-coated sand according to the present invention is a lamination molding resin-coated sand used for lamination molding for forming a laminated article by laminating sand layers in thickness direction, and wherein sand particles coated with resin are about 20 to 100 μm in diameter and generally spherical.

A lamination molding method according to the present invention is comprising a step of preparing resin-coated sand of generally spherical sand particles each having a particle diameter of 20 to 100 μm and coated with resin; a sand application step of applying the resin-coated sand to form a thin sand layer; a laser radiation step of radiating a laser beam onto the sand layer to cure the resin; alternately repeating the sand application step and the laser radiation step until sand layers are laminated in thickness direction and an article is formed.

The resin-coated sand of the present invention is advantageous to the enhancement of accuracy for the shape and dimensions of a formed article as well as the quality of the article. The lamination molding method of the present invention is advantageous to the enhancement of accuracy for the shape and dimensions of a formed article as well as of the quality of the article, even if sand layers are thin.

DESCRIPTION OF THE PREFERRED EMBODIMENTS

Figure 1:
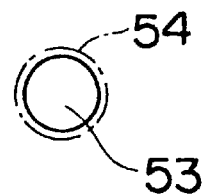
FIG. 1 is a typical view showing resin-coated sand of sand particles coated with resin.

A sand particle coated with resin is about 20 to 100 μm in diameter and generally spherical.

'Generally spherical' means that a shape is substantially spherical. For instance, the projection surface of the sand particle has preferably a long diameter to short diameter ratio of about 1.0 to 1.3.

If the diameter of the sand particle is too large, the irregularity of the surface of a sand layer becomes large, which limits the enhancement of accuracy for a formed article. If the diameter of the sand particle is too small, the irregularity of the surface of a sand layer can be eased. In the latter case, however, if sand particles are mixed with resin for coating sand with resin, mixing uniformity is lowered. Besides, the discharge efficiency of discharging gas generated during casting operation is extremely deteriorated, as well. Considering these disadvantageous respects, the lower limit of the particle diameter may be set at 30 μm or 40 μm, whereas the upper limit thereof may be set at 90 μm, 80 μm or 70 μm. It is preferable that the diameters of sand particles are uniformly centered around a predetermined range of 20 to 100 μm. For instance, with the overall sand particles assumed as 100% by weight, 50% or more, or particularly 60% or more, by weight of the particles can have diameters of 60 to 100 μm.

The sand particle has preferably a low coefficient of thermal expansion. With a low coefficient, it is possible to inhibit the thermal expansion of sand particles at the time of radiating a laser beam onto and heating the particles and to ensure the high accuracy of a resultant formed article. In addition, it is possible to suppress distortion and core cracking resulting from thermal deformation during casting operation. The sand particles may be, for example, mullite, zirconia and olivine containing sand. The mullite containing sand indicates sand containing not only mullite but other components.

If a laser beam is radiated onto the resin-coated sand, resin is thermally cured and the sand particles adjacent each other are combined and solidified. Obviously, therefore, the resin used herein is thermosetting resin such as phenolic resin.

The laser beam used in a laser radiation step may be appropriately selected from among well-known beams of a $CO_2$ laser beam, a YAG laser beam and the like. Both the visible and invisible laser beams may be employed herein.

The resin has a fusion temperature of 100° C. or higher in order to ensure accuracy for a formed article. Thus, the upper limit of the fusion temperature of the resin can be set at, for example, 130° C. The fusion temperature is based on the JACT (Japan Association of Casting Technique) testing method. Specifically, in this method, resin-coated sand is applied on an iron plate having a temperature gradient (e.g., 50 to 150° C.), air is supplied to blow off the sand after 60 seconds and the low temperature part of the remaining sand is measured. If taking account of the need to keep the above-stated fusion temperature, the mean molecular weight can be, for example, about 2000 to 10000. Normally, if the mean molecular weight is lighter, resin fusion temperature tends to fall. If the mean molecular weight is heavier, mixing uniformity for mixing resin and sand particles tends to be lowered due to the viscosity of resin. The mean molecular weight of resin can be appropriately selected in accordance with the required fusion temperature of the resin, the need to keep mixing uniformity for mixing resin and sand particles, particle size and the like. It is possible to select, for example, about 3000 as the lower limit and about 8000 as the upper limit.

Now, the embodiment of the present invention will be described with reference to the drawings.

This embodiment concerns a case where the present invention is applied to lamination molding for obtaining a casting mold as a formed article by the radiation of a $CO_2$ laser beam.

FIG. 1 is a typical view showing the conceptual constitution of resin-coated sand having sand particles coated with resin. A resin-coated sand particle 53 in this embodiment is far smaller in particle diameter than a resin-coated particle used in the conventional shell molding method. The particle 53 used herein is generally spherical. The sand particle 53 is coated with thermosetting resin 54.

The sand particle 53, which is an artificial sand particle, is of sphere shape substantially close to a true sphere and consists of mullite having a low coefficient of thermal expansion.

Figure 2:
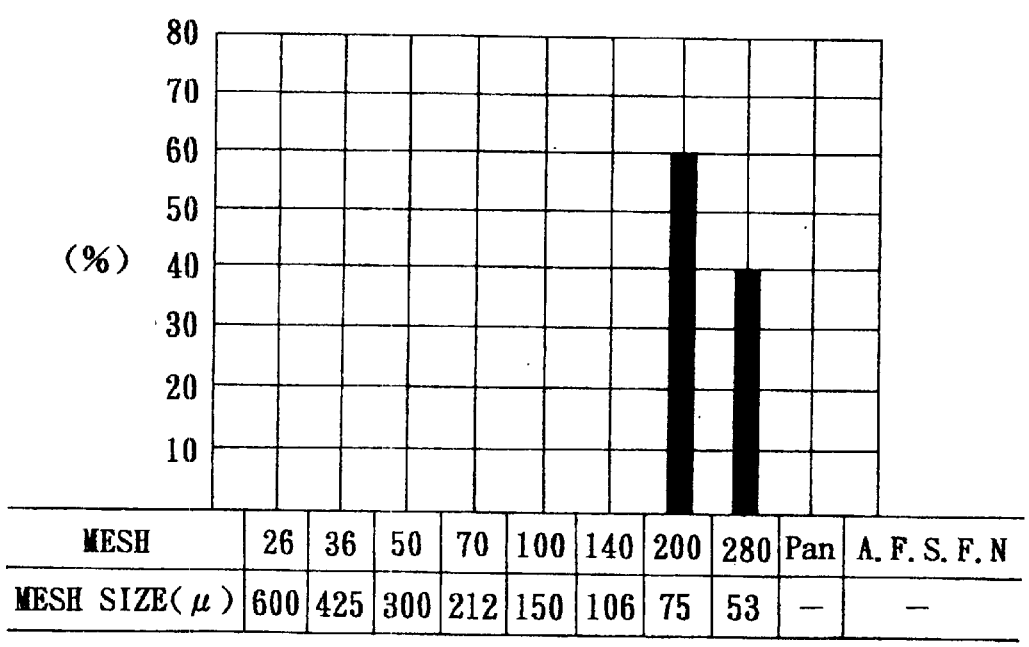
FIG. 2 is a graph showing the particle diameter distribution of the sand particles.

The particle size distribution of the sand particles 53 used herein is shown in FIG. 2. As shown in FIG. 2, with the entire sand particles assumed as 100% by weight, those passed through a 140 mesh and stopped by a 200 mesh occupied about 60% by weight. Those passed through the 200 mesh and stopped by a 280 mesh occupied about 40% by weight. Based on this, the diameters of the sand particles 53 used in this embodiment are set at 53 to 100 μm.

The resin 54 is phenolic resin of novolak type. The fusion temperature thereof is equal to or higher than 100° C., that is, about 110° C. and the mean molecular weight thereof is 3000 to 8000.

According to this embodiment, 3 to 5 weight parts of resin were added to 100 weight parts of sand particles.

23% by weight of hexamethylenetetramine and 0.1% by weight of calcium stearate were added, as additive, to resin. It is noted that sand particles tend to be solidified into large particles in mixing and the large particles are desirably removed by a mesh.

Figure 3A:
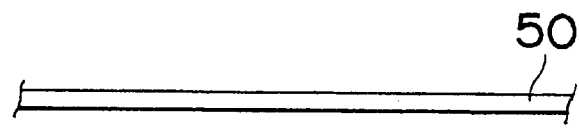
FIGS. 3A to 3D are block diagrams showing the neighborhood of a sand layer and a solidified layer.
Figure 3B:
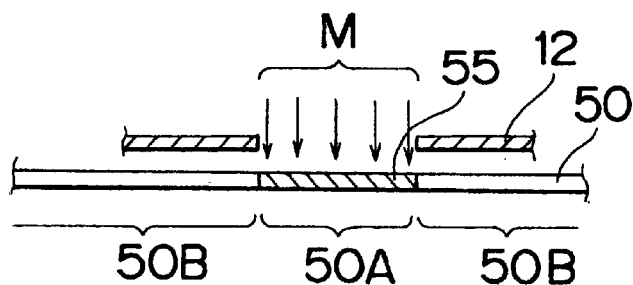
Figure 6:
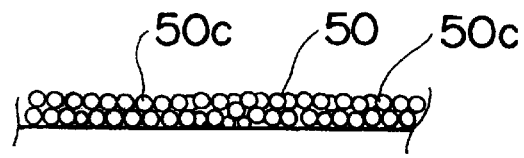
FIG. 6 is a conceptual block diagram of a sand layer in case of forming the sand layer out of the resin-coated sand in an embodiment according to the present invention.
Figure 7:
FIG. 7 is a conceptual block diagram showing a case of forming a sand layer out of resin-coated sand used in the shell molding method.

As shown in FIGS. 3A and 6, a sand application step of thinly applying resin-coated sand 50c onto a mount surface to form a sand layer 50 is executed by a sand application apparatus. The target thickness of the sand layer 50 is extremely small, i.e., 0.1 to 0.2 mm. With the sand layer 50 being extremely thin as in this case, if the diameters of resin-coated sand particles 53 are generally spherical and 20 to 100 μm, then they are advantageous in inhibiting part of the sand particles 53 from protruding from the surface of the sand layer and the upper surface of the sand layer 50 can be smoothed compared with the conventional case shown in FIG. 7. Further, due to the generally spherical sand particles 53, roll bearing effect can be expected and discharge efficiency at the time of discharging the resin-coated sand 50c from the sand application apparatus can be, thereby, enhanced. After the sand application step, a laser radiation step of radiating a laser beam M ($CO_2$ laser beam) in a predetermined locus through a mask 12 onto the sand layer 50 as shown in FIG. 3B, is executed. In the sand layer 50, the resin in a laser radiation region 50A onto which the laser beam M is directly radiated is thermally cured to combine sand particles and form a solidified layer 55. On the other hand, resin in a laser non-radiation region 50B onto which the laser beam M is not radiated, on the sand layer 50 is not originally thermally cured.

Figure 3C:
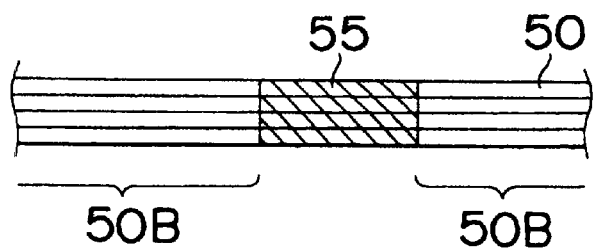
Figure 3D:
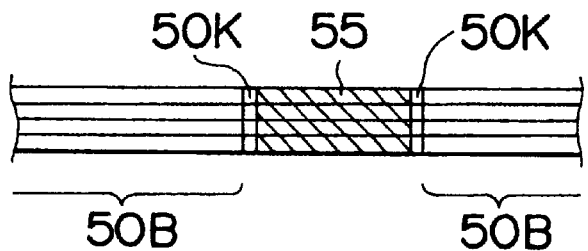

By repeating the sand application step and the laser radiation step, plural solidified layers 55 are laminated in the thickness direction as shown in FIG. 3C and a casting mold is formed as a resultant article. The number of laminated layers is about 200 to 2000.

Meanwhile, since the interface between the laser radiation region 50A and the laser non-radiation region 50B receives heat transmitted from the laser radiation region 50A, temperature tends to rise at the interface and the interface may be cured or semi-cured by the influence of the transmitted heat.

Figure 4:
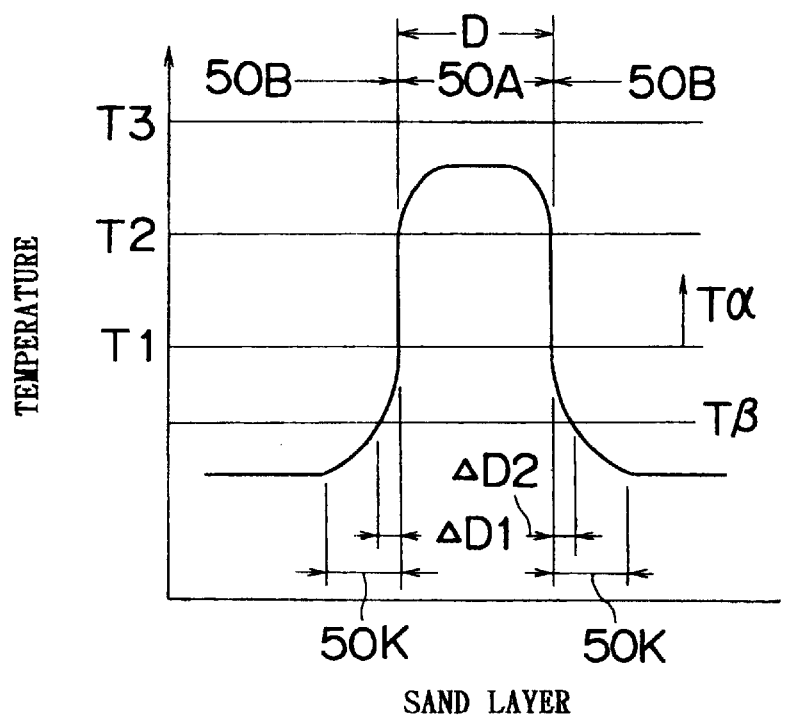
FIG. 4 is a graph showing temperature distribution in case a laser beam is radiated.

FIG. 4 shows the distribution of highest temperatures around the laser radiation region 50A onto which the laser beam M is radiated. As shown in FIG. 4, the temperature of the laser radiation region 50A onto which the laser beam M is directly radiated is high, i.e., higher than T1 and T2 and close to T3. The resin in the laser non-radiation region 50B onto which the laser beam M is not directly radiated is originally not thermally set.

Based on the measurement values right after laser radiation measured by a thermometer, it is considered that T1 is about 100° C., T2 is about 200° C. and T3 is about 300° C. while the laser beam M is being radiated.

The temperature of the interface between the laser radiation region 50A and the laser non-radiation region 50B rises after receiving heat transmitted from the laser radiation region 50A of higher temperature, and the interface turns into a heat transmission region 50K. In the heat transmission region 50K, if the temperature of the resin becomes higher than the fusion temperature $T\beta$ (=the fusion temperature of conventional resin-coated sand), resin is thermally cured in the heat transmission region 50K to thereby cure or semi-cure the heat transmission region 50K. Accordingly, although the transmission region 50K is not directly radiated with the laser beam M, the region 50K might be possibly cured or semi-cured. Due to this, although only a target range D which is a region to be radiated with the laser beam M is intended to be cured, the range D is increased by the ranges corresponding to $\Delta D1$ and $\Delta D2$. Thus, despite the use of a laser beam M of high directivity, an attempt to enhance accuracy for the shape and dimensions of the solidified layer 55 and, therefore, that of the shape and dimensions of a resultant formed article is limited.

In this respect, according to this embodiment, the fusion temperature $T\alpha$ of the resin of the resin-coated sand 50c is increased ($T\alpha > T\beta$) and the fusion temperature $T\alpha$ is set to be equal to or higher than T1, i.e., equal to or higher than 100° C. As a result, while heat is transmitted from the laser radiation region 50A which is heated at high temperature to the heat transmission region 50K, the resin in the heat transmission region 50K can not reach the fusion temperature $T\alpha$. That is, the temperature of the region 50K cannot exceed 100° C. Thus, $\Delta D1$ and $\Delta D2$ are suppressed to thereby inhibit the resin in the heat transmission region 50K from being thermally set unnecessarily. This is advantageous in further enhancing accuracy for the formed article.

According to this embodiment, the sand particles 53 are mullite particles having a low coefficient of thermal expansion, so that thermal expansion of the sand particles 53 heated due to the laser beam M and, therefore, the thermal expansion of the solidified layer 55 can be advantageously inhibited. In this sense, too, further enhancement of accuracy can be advantageously realized.

Molten metal is supplied to the molded cavity in the casting mold which has been formed based on this embodiment and the metal is solidified to thereby form a casting. After solidification, the casting mold is broken to take the casting out of the casting mold.

By the way, in this embodiment, gas is emitted from the resin of the resin-coated sand 50c during casting operation. However, due to the small diameters of the sand particles 53 of the resin-coated sand 50c, clearances between adjacent sand particles 53 are narrowed and the discharge efficiency of discharging the emitted gas outside from the casting mold tends to be deteriorated. In addition, since the quantity of added resin is larger than that in the conventional case, the strength of the casting mold tends to be excessively high. As a result, if the mold is broken after forming a casting, the collapsible property of the casting mold tends to be lowered.

In view of the above disadvantages, according to the present invention, after removing the non-radiation region 50B which has not been thermally cured because no laser beam is applied, the casting mold consisting of the applied region 50A is subjected to after-heat treatment, such as the application of burner fire to the casting mold or the installation of the casting mold into a heat treatment furnace, before the molten metal is poured into the mold. By doing so, the resin in the casting mold is further heated in a stage before molten metal is poured into the mold and the quantity of gas emitted from the resin in the casting mold during casting operation is reduced. Also, by heating the resin again, the collapsible property of the casting mold after forming a casting can be secured.

Furthermore, according to this embodiment, it is preferable that a vent hole is added to the casting mold so as to ensure the gas discharge efficiency of discharging gas outside from the casting mold and to ensure the collapsible property of the casting mold after forming a casting.

Figure 5:
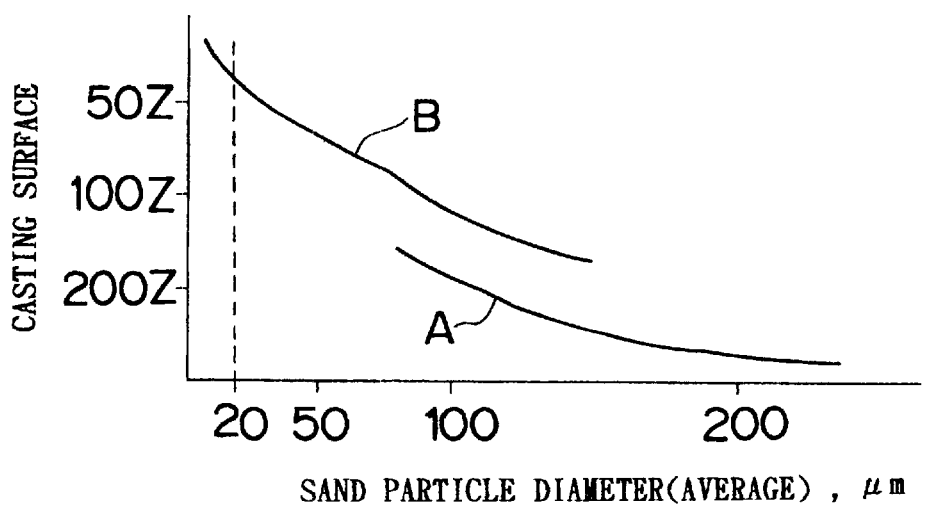
FIG. 5 is a graph showing the relationship between the particle diameter of a sand particle and the casting surface of a casting.

The inventor of the present invention also studied the relationship between the (average) particle diameter of the sand particles of the resin-coated sand 50c and the casting surface of a casting formed using the casting mold and the sand particles. Target particle diameters are in the range of less than 20 $\mu$m to 220 $\mu$m. The result of a test is shown in FIG. 5. The casting surface of a casting is evaluated based on the standard test piece (according to JIS-B0659). If a casting was formed into the casting mold which is lamination-formed using resin-coated sand (sand particles: non-spherical; fusion temperature: 70 to 80° C.), the casting did not have a good casting surface, i.e., 15 oz or less, as indicated by a characteristic line A of FIG. 5. If using the resin-coated sand 50c dedicated to lamination molding (the sand particles 53: generally spherical; resin fusion temperature: 110° C.) as in this embodiment stated above, by contrast, a resultant casting had a good casting surface, as indicated by a characteristic line B of FIG. 5. If the average diameter of the sand articles 53 is too small, i.e., 20 $\mu$m or less, then a good casting surface can be obtained but the mixing efficiency of mixing sand and resin is considerably deteriorated. As a result, it is substantially impossible to uniformly mixing sand and resin. For these reasons, the diameters of the sand particles 53 are preferably 20 to 100 $\mu$m.

Figure 8:
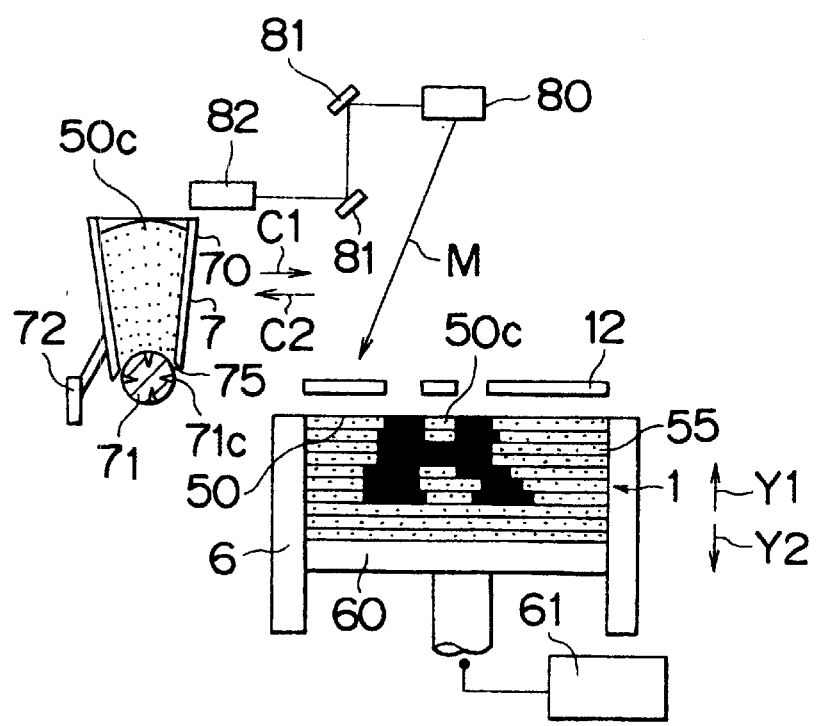
FIG. 8 is a block diagram typically showing the entire constitution, partly in cross-section, of a case of employing the present invention.

FIG. 8 shows an example in which the present invention is utilized. In this example, an elevating board 60 is provided in a fixed frame 6 so that the board 60 can be elevated in directions of arrows Y1 and Y2 by elevation means 61 such as a cylinder mechanism or a motor mechanism. The sand application apparatus 7 for applying resin-coated sand 50c is provided to be horizontally movable in arrow C1 direction (sand application direction) and arrow C2 direction (return direction). The sand application apparatus 7 comprises a container 70 for housing the resin-coated sand 50c therein, a rotatable delivery roller 71 mounted at the bottom of the container 70 and a flattening plate 72 provided adjacent the container 70.

A main laser radiation part 80 of scan type is provided above the fixed frame 6 for applying diffused laser beams M. A rotary mirror 81, which is not shown in FIG. 8, for continuously changing the radiation angle of the laser beam M is built in the main laser radiation part 80. The part 80 is also provided with a main laser generator 82 ($CO_2$ laser, output: 1 kW to 10 kW, for example) for outputting a laser beam M through a reflection mirror 81.

In this example, first, while the sand application apparatus 7 is guided by a guide rail, which is not shown in FIG. 8, and moved in the arrow C1 direction, the delivery roller 11 rotates and the resin-coated sand 50c is discharged outside of the container 70 from an outlet 75 by grooves 71 of the roller 71. Then, the resin-coated sand 50c is applied on the upper surface of the elevating board 60 to thereby form a sand layer 50 (thickness: 0.1 to 0.2 $\mu$m).

At this moment, the flattening plate 72 is moved in the same direction in cooperation with the container 70, so that the upper surface of the sand layer 50 is flattened by the flattening plate 72. Thereafter, the sand application apparatus 7 is returned in the arrow C2 direction, thus completing the sand application step.

Next, the laser radiation step is executed for radiating a laser beam M from the main laser radiation part 80 onto a predetermined region of the sand layer 50 through the mask 12.

As stated above, if the sand application step and the laser beam M radiation step are executed, part of the sand layer 50 is solidified and a solidified layer 55 is formed. If the sand application step and the laser application step are repeatedly executed, plural solidified layers 55 are gradually laminated in thickness direction, as already described above (the number of laminated layers: 200 to 1000, for example). Hence, a casting mold 1 is obtained as a two-dimensional formed article.

What is claimed is:

1. A resin-coated sand used in a lamination molding process for forming a laminated article by laminating sand layers in a thickness direction, the resin-coated sand comprising:

generally spherical sand particles about 20 to 100 $\mu$m in diameter and coated with a laser radiation-cured resin, said resin having a fusion temperature of about 100° C. or higher and a mean molecular weight of about 2,000 to 10,000.

2. The resin-coated sand according to claim 1, wherein said sand particles contain mullite.

3. A method, comprising:

preparing resin-coated sand of generally spherical sand particles each having a particle diameter of 20 to 100 $\mu$m and coated with resin, said resin having a fusion temperature of about 100° C. or higher and a mean molecular weight of about 2,000 to 10,000;

a sand application step of applying said resin-coated sand to form a thin sand layer;

a laser radiation step of radiating a laser beam onto said sand layer to cure said resin;

alternately repeating said sand application step and said laser radiation step until sand layers are laminated in a thickness direction and an article is formed.

4. The method of claim 3, wherein said sand particles contain mullite.

* * * * *